O. F. WOODWARD.
Composition of Matter for Making Molded Articles of Manufacture.
No. 225,261.  Patented Mar. 9, 1880.
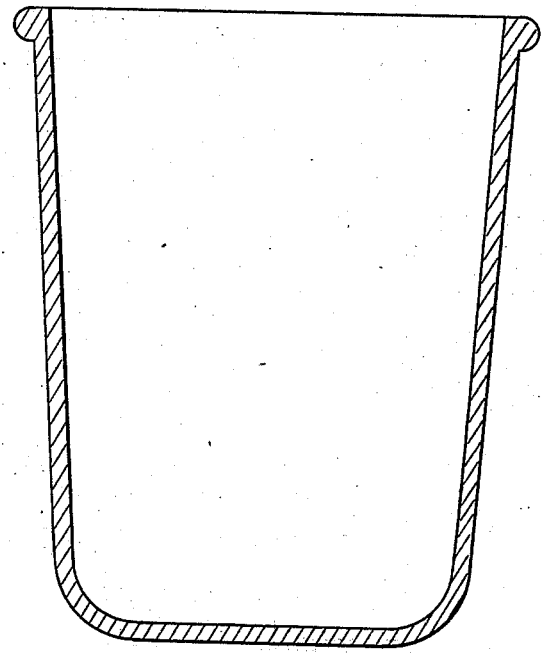

UNITED STATES PATENT OFFICE.

ORATOR F. WOODWARD, OF LE ROY, NEW YORK, ASSIGNOR OF ONE-HALF OF HIS RIGHT TO FRANCIS C. LATHROP, OF SAME PLACE.

COMPOSITION OF MATTER FOR MAKING MOLDED ARTICLES OF MANUFACTURE.

SPECIFICATION forming part of Letters Patent No. 225,261, dated March 9, 1880.

Application filed August 11, 1879.

*To all whom it may concern:*

Be it known that I, ORATOR F. WOODWARD, of Le Roy, Genesee county, New York, have invented a certain new and useful Improvement in Compositions of Matter for Making Molded Articles of Manufacture; and I do hereby declare that the following is a full, clear, and exact description of the same.

The object of my invention is to produce a composition of matter which can be molded into various articles of manufacture, such as flower-pots, vases, cuspadores, &c., at small cost, and which will be strong, substantial, and present a good appearance.

The invention consists of a compound of gypsum or plaster-of-paris and rosin, thoroughly mixed, as hereinafter described.

In the compounding of this mixture I prefer about the following proportions, by weight, (but they may be varied as necessity requires:) gypsum, one hundred and twenty-five pounds; rosin, one hundred pounds.

The rosin is melted and mixed with the gypsum, being thoroughly stirred in the heated state. While still hot, and in a fluid state, the material is turned into a hollow mold, (in case a hollow article is to be formed,) and after standing long enough in the mold to form a crust or shell by the cooling of the outside the interior contents of the mold are turned off, which leaves the article perfectly formed, and it may then be removed by opening the mold in the ordinary way.

Solid articles may be formed by simply turning into the mold and allowing the material to cool, as in casting iron.

The articles thus produced can be left in their natural state, or can be finished or ornamented by painting, staining, or otherwise.

The drawing accompanying this specification shows a flower-pot made in the above-described manner.

If desired, various coloring-matters may be mixed with the material before molding, to produce the desired color of the articles made.

Pitch may be used in the place of rosin with the same result.

The gypsum furnishes the granular material, while the rosin furnishes the adhesive matter.

The compound produced, when cold, is of fine texture, resembling glass, being free from pores, and so fine-grained that water cannot pass.

In the act of molding the cooling of the material leaves a glazed or polished surface both outside and inside, caused by the use of the rosin, which presents a fine appearance, and also resists water.

Articles thus made are very cheap, strong, and substantial, much more so than earthenware, and require no glazing or treatment to hold water. If desired, the articles may be dipped to finish them.

Having thus described my invention, I claim—

The compound herein described, consisting of gypsum and rosin mixed together under heat, and used for making molded articles of manufacture, as specified.

In witness whereof I have hereunto signed my name in the presence of two subscribing witnesses.

ORATOR F. WOODWARD.

Witnesses:
H. W. HASCALL,
S. F. COMSTOCK.